United States Patent Office

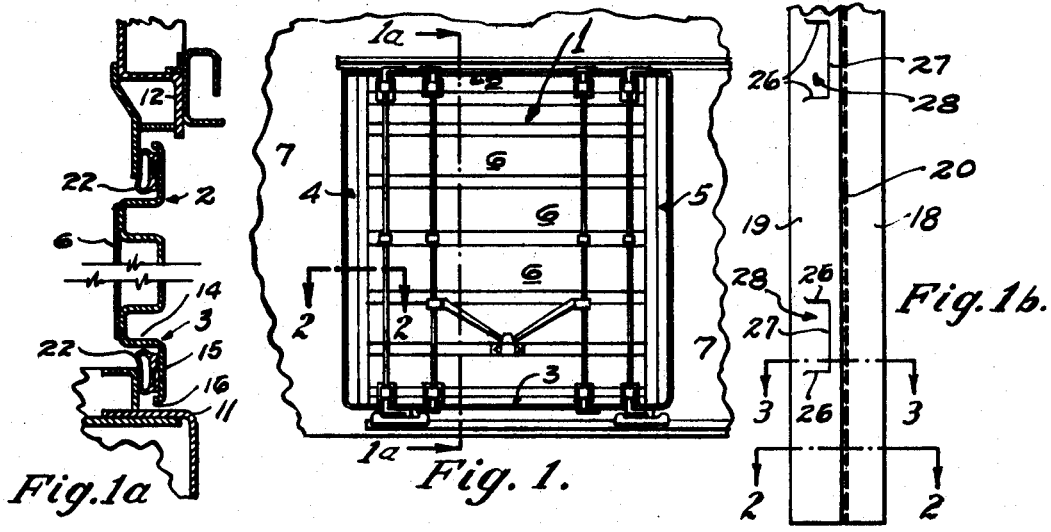
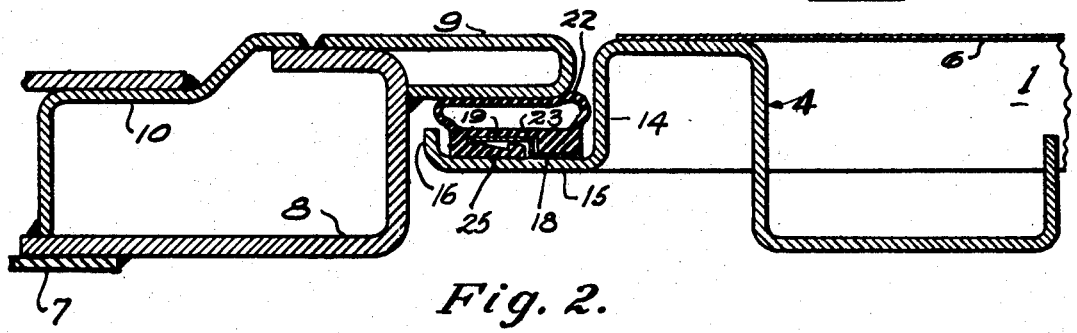
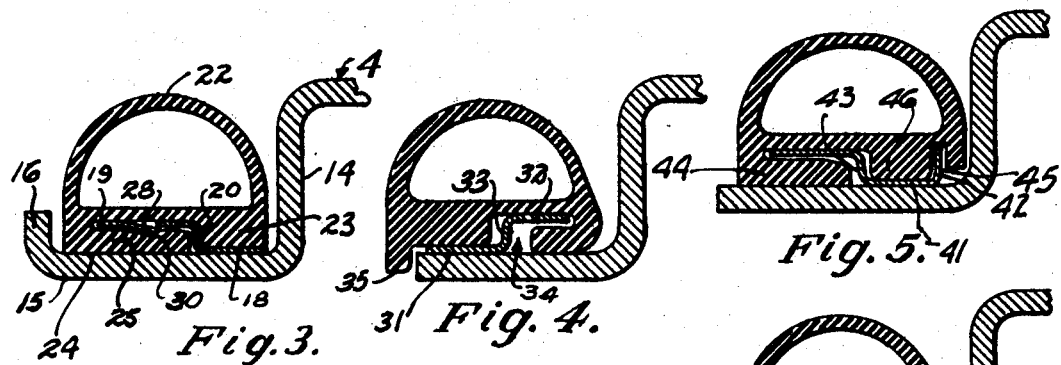
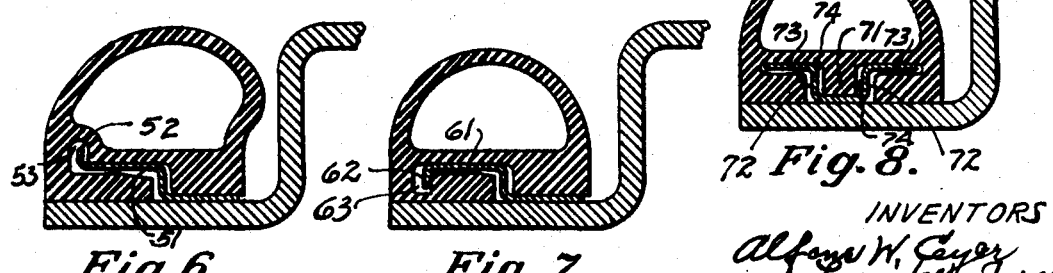

3,388,502
Patented June 18, 1968

3,388,502
SEALING STRUCTURE
Alfons W. Ceyer, Berwyn, and Leonidas Jaras, Chicago, Ill., assignors, by mesne assignments, to Evans Products Company, Plymouth, Mich., a corporation of Delaware
Filed Sept. 27, 1965, Ser. No. 490,255
8 Claims. (Cl. 49—493)

ABSTRACT OF THE DISCLOSURE

A sealing arrangement for a railway car side door including several embodiments of flexible seals and attaching members supported around the periphery of the door and adapted to engage the car side wall structure.

---

The invention relates to sealing structure adapted for, but not limited to, closing the crevice between a door and the framing of a wall opening which the door may unclose or uncover. The invention comprises a thin mounting strip of sheet metal or like material, for attachment to the door framing, and a flexible gasket element readily applicable to the mounting strip independently of nails or other elements inserted through the gasket.

Among the objects of the invention are to secure the gasket throughout its length and to avid perforation or distortion of the gasket by nails, etc., to facilitate shipment of the gasket separately from the mounting strip and the door or like member with which it is to be assembled and thereby prevent damage to the gasket in shipment and also to facilitate replacement of the gasket if damaged in use, all without special tools or skills.

This invention is particularly adapted for embodiment in a sealing arrangement for reflecting a seal between a pair of relatively movable members having facing, elongated surfaces to be sealed. The sealing arrangement comprises an elongated attaching member adapted to be affixed to one of the surfaces and which detachably supports an elongated flexible seal. The attaching member has a first leg portion that is fixed to the one surface to be sealed, a second leg offset from the first leg and a web integrally connecting the legs. The seal has a base in which a recess comprised of first and second angularly related portions is formed. The first recess portion extends through one face of the base and receives the web of the attaching member and the other recess portion receives the second leg of the attaching member. A groove is formed in the base of the flexible seal and means integral with the attaching member presents an edge offset to the second leg and engaging the portion of the base defining the groove for assisting in affixing the flexible seal to the attaching member.

In the accompanying drawings illustrating the invention:

FIG. 1 is an elevational view of a railway car side door and a portion of the car wall alongside of which the door may be moved away from the opening.

FIG. 1a is a vertical section on line 1a—1a of FIG. 1, but on a larger scale, through the top and bottom of the door and adjacent car wall portions.

FIG. 1b is an elevational view of a mounting member of the sealing structure and is drawn to an enlarged scale.

FIG. 2 is a longitudinal horizontal section on line 2—2 of FIG. 1, drawn to a larger scale, and shows the sealing gasket distorted when the door is fully closed by being moved transversely of the wall to "plug" the opening and distort the flexible gasket. The attaching member is sectioned on line 2—2 of FIG. 1b.

FIG. 3 is a similar section through the structure but on a larger scale and showing the gasket free of compression and showing the attaching member sectioned on line 3—3 of FIG.1b.

FIGS. 4, 5, 6, 7 and 8 each corresponds to FIG. 3 but shows a variation in the sealing structure.

The door 1 has top, bottom, front and rear edging members 2, 3, 4 and 5 respectively, preferably of rolled or pressed steel angular sections, and a body of steel plate or panels 6. The car side wall 7 includes front and rear door posts each having a main section 8 provided with a door stop 9 and an inner wall mounting element 10 welded to section 8. A wall threshold 11 and side plate 12 has door receiving and opposing contours similar to the wall side posts.

The door front edging 4 has an angular portion with legs 14, 15 facing toward stop 9, leg 15 terminating in an inturned lip 16. The sealing structure is received in the shallow U-shaped channel formed by legs 14, 15 and lip 16 and includes an elongated mounting member of relatively thin metal or plastic of shallow Z section with parallel attaching and retaining flanges 18, 19 offset from each other and extending in opposite directions from a connecting web 20. Mounting flange 18 is welded, riveted or otherwise secured to angle leg 15. Retaining flange 19 is spaced from leg 15. The elongated gasket is of yielding rubber-like material and comprises an elongated hollow tube with a flexible semicircular wall 22 and a relatively thick, stiff, but distortable, base 23 having a substantially flat exterior face 24. Base 23 is slotted inwardly from face 24 and then parallel to face 24 intermediate its inner and outer faces, thus forming an L-shaped recess and a flap 25. The elements of the base may be distorted and stretched to receive retaining flange 19 and web 20 of the mounting strip in the slot in the base and thereby resist removal of the gasket from the mounting strip unless the gasket is again intentionally distorted and stretched.

Preferably retaining flange 19 has pairs of transverse slits 26 at intervals, each extending for a distance less than the full width of the flange, and associated slits 27 connecting corresponding ends of the transverse slits and forming therewith three-sided portions 28 which are bent or offset, as best shown in FIG. 3, to form an edge disposed to abut a reentrant groove 30 at the side of the slot in the gasket base, thereby resisting separation from the mounting member unless it is distorted and twisted in a manner unlikely to result from normal contact of the gasket with the door post, lading, or a loading truck.

In the modification shown in FIG. 4, mounting member flanges 31, 32 extend from the connecting web 33 in opposite directions from that shown in FIG. 3. The slot 34 in the gasket base extends inwardly from the exterior face of the base as in FIG. 3 but then away from the outer periphery of the door edging. The gasket base has a depending rib 35 forming a shoulder opposing the outer periphery of the door edging and holding the inner part of the gasket from accidental distortion out of engagement with retaining flange 32.

In FIG. 5 flange 41 of the Z-shaped attaching member has an upstanding portion 42 parallel to the flange-connecting web 43 and these parts form an upwardly facing channel. The thick base 44 of the gasket is grooved at 45 to form a depending rib 46. The portion of the gasket base between groove 45 and the intermediate slot, through which the retaining flange is inserted, is seated in the attaching strip channel.

In FIG. 6 the attaching strip retaining flange 51 terminates in an upturned lip 52 and the gasket has a groove 53 receiving lip 52. Otherwise the sealing device corresponds to that shown in FIGS. 1–3.

FIG. 7 shows the retaining flange 61 of the attaching strip provided with a downturned lip 62 and the gasket is grooved at 63 to receive the lip.

In FIG. 8 the retaining strip is U-shaped rather than Z-shaped and receives a gasket depending rib 71 between the strip legs 72. Each of the legs has a wide flange 73 and the gasket is slotted at 74 to receive these flanges.

In each form of the sealing device it is preferable to cement the gasket to the attaching strip and door edging for additional securing effect and for better protection against weather and other surface deteriorating elements but this is not essential to retaining the gasket on the door edging.

Other variations in the details of the attaching strip and the gasket may be made without departing from the spirit of the invention and the exclusive use of those modifications coming within the scope of the claims is contemplated.

What is claimed is:

1. A sealing arrangement for effecting a seal between a pair or relatively movable members having facing elongated surfaces to be sealed, said sealing arrangement comprising an elongated attaching member having a first leg adapted to be affixed to one of the surfaces to be sealed, a second leg offset from said first leg and a web integrally connecting said legs, an elongated flexible seal having a base detachably affixed to said attaching member and a readily deformable section adapted to engage the other surface to be sealed, said base being formed with a recess comprised of first and second angularly related portions, said first recess portion extending through one face of said base and receiving said attaching member web, said other receess portion receiving said second leg of said attaching member, said recess in said base forming a flap disposed between said leg of said attaching member and the first surface to be sealed, a groove formed in said base of said flexible seal, and means integral with said attaching member presenting an edge offset to said second leg and engaging the portion of said base defining said groove for assisting in affixing said flexible seal to said attaching member.

2. A sealing arrangement as set forth in clam 1 wherein the last named means is integral with the second leg of the attaching member.

3. A sealing arrangement as set forth in claim 2 wherein the last named means is formed as an outstanding flange between the web and the outer termination of the second leg of the attaching means.

4. A sealing arrangement as set forth in claim 3 wherein the groove in the base of the flexible seal extends from the recess and is formed in the flap.

5. A railway car plug door or the like comprising a side wall defining a doorway opening bounded at least in part by a surface to be sealed, a door supported for movement relative to said side wall from an opened position to a closed position within said doorway opening, said door having an outwardly extending flange defining a surface adapted to face said surface of said side wall when said door is in its closed position, an elongated attaching member having a first leg, a second leg offset from said first leg and a web integrally connecting said legs, means for affixing said first leg to said surface of said flange, and an elongated flexible seal having a base detachably affixed to said attaching member and a readily deformable section adapted to engage said surface of said side wall, said base being formed with a recess comprised of first and second angularly related portions, said first recess portion extending through one face said base and receiving said attaching member web, said other recess portion receiving said second leg of said attaching member, said recess in said base forming a flap disposed between said second leg of said attaching member and said surface of said door, a groove formed in said base of said flexible seal, and means integral with said attaching member presenting an edge offset to said second leg and engaging the portion of said base defining said groove for assisting in affixing said flexible seal to said attaching member.

6. A railway car plug door or the like as set forth in claim 5 wherein the last named means is integral with the second leg of the attaching member.

7. A railway car plug door or the like as set forth in claim 6 wherein the last named means is formed as an outstanding flange between the web and the outer termination of the second leg of the attaching means.

8. A railway car plug door or the like as set forth in claim 7 wherein the groove in the base of the flexible seal extends from the recess and is formed in the flap.

References Cited
UNITED STATES PATENTS

| | | | |
|---|---|---|---|
| 2,130,017 | 9/1938 | Lewis | 49—493 X |
| 2,220,695 | 11/1940 | White. | |
| 2,369,911 | 2/1945 | Lind et al. | |
| 2,684,508 | 7/1954 | Meyers et al. | 49—485 X |
| 2,773,571 | 12/1956 | Kelly | 49—490 X |
| 2,993,243 | 7/1961 | Beauchamp | 49—498 |
| 2,995,786 | 8/1961 | Beauchamp. | |
| 3,074,754 | 1/1963 | Komenda | 49—485 |
| 3,145,434 | 8/1964 | Majoy | 49—493 X |
| 3,171,164 | 3/1965 | Soddy | 49—473 |
| 3,187,388 | 6/1965 | Bagley | 49—493 X |

FOREIGN PATENTS

| | | |
|---|---|---|
| 491,963 | 4/1953 | Canada. |

DAVID J. WILLIAMOWSKY, *Primary Examiner.*

P. C. KANNAN, *Assistant Examiner.*

UNITED STATES PATENT OFFICE
CERTIFICATE OF CORRECTION

Patent No. 3,388,502 June 18, 1968

Alfons W. Ceyer et al.

It is certified that error appears in the above identified patent and that said Letters Patent are hereby corrected as shown below:

Column 1, line 27, "avid" should read -- avoid --. Column 3, line 30, "receess" should read -- recess --; line 32, after "said" insert -- second --; line 39, "clam" should read -- claim --.

Signed and sealed this 25th day of November 1969.

(SEAL)
Attest:

Edward M. Fletcher, Jr.        WILLIAM E. SCHUYLER, JR.
Attesting Officer            Commissioner of Patents